(12) United States Patent
Kumar et al.

(10) Patent No.: US 8,949,857 B2
(45) Date of Patent: Feb. 3, 2015

(54) VALUE PROVIDER SUBSCRIPTIONS FOR SPARSELY POPULATED DATA OBJECTS

(75) Inventors: Dileep Kumar, Redmond, WA (US);
Michal Nowak, Bellevue, WA (US);
Joseph W. Hallock, Renton, WA (US);
Keeron Modi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 13/183,433

(22) Filed: Jul. 15, 2011

(65) Prior Publication Data

US 2013/0019251 A1    Jan. 17, 2013

(51) Int. Cl.
*G06F 9/46* (2006.01)
*G06F 9/54* (2006.01)

(52) U.S. Cl.
CPC ........................... *G06F 9/542* (2013.01)
USPC ............................................... 719/318

(58) Field of Classification Search
CPC ............................................. G06F 9/542
USPC ............................................... 719/318
See application file for complete search history.

(56) References Cited

U.S. PATENT DOCUMENTS

| | | | |
|---|---|---|---|
| 4,437,093 A | | 3/1984 | Bradley |
| 5,487,141 A | | 1/1996 | Cain et al. |
| 5,805,133 A | | 9/1998 | Priem et al. |
| 5,956,515 A | * | 9/1999 | Beals et al. ............ 717/170 |
| 5,974,428 A | | 10/1999 | Gerard et al. |
| 6,801,229 B1 | | 10/2004 | Tinkler |
| 6,850,944 B1 | | 2/2005 | MacCall et al. |
| 6,950,874 B2 | * | 9/2005 | Chang et al. ............ 709/229 |
| 6,966,002 B1 | | 11/2005 | Torrubia-Saez |
| 7,209,901 B2 | | 4/2007 | Schull |
| 7,313,764 B1 | | 12/2007 | Brunner et al. |
| 7,496,829 B2 | | 2/2009 | Rubin et al. |
| 7,702,639 B2 | | 4/2010 | Stanley et al. |
| 7,721,307 B2 | | 5/2010 | Hendricks et al. |
| 8,103,969 B2 | | 1/2012 | Gupta et al. |
| 8,219,528 B1 | | 7/2012 | Greene et al. |
| 2003/0122874 A1 | | 7/2003 | Dieberger et al. |
| 2004/0268270 A1 | | 12/2004 | Hill et al. |
| 2005/0091596 A1 | | 4/2005 | Anthony et al. |
| 2005/0286428 A1 | | 12/2005 | Oksanen et al. |

(Continued)

OTHER PUBLICATIONS

Modern Operating Systems, 3rd Edition, Andrew S. Tanenbaum, ISBN0136006639 @2008 by Pearson Education Inc.*

(Continued)

*Primary Examiner* — Charles Swift
*Assistant Examiner* — Charlie Sun
(74) *Attorney, Agent, or Firm* — Henry Gabryjelski; Kate Drakos; Micky Minhas

(57) ABSTRACT

A calling routine may identify portions of a data object that may be populated by other executable routines by creating a property requested event. An event may be created for the requested property and one or more subscribing routines may launch. The subscribing routines may process separately from the calling routine and return property values, which in turn may create a property changed event, which may be subscribed to by the calling routine. The calling routine may then process the requested data. In one embodiment, a data object may be populated on a property-by-property basis by various subscribing routines, creating a sparsely populated data object that may be updated dynamically by routines identified at runtime.

20 Claims, 4 Drawing Sheets

(56) References Cited

U.S. PATENT DOCUMENTS

| | | |
|---|---|---|
| 2006/0036960 A1 | 2/2006 | Loui |
| 2006/0156228 A1 | 7/2006 | Gallo et al. |
| 2006/0156237 A1 | 7/2006 | Williams et al. |
| 2006/0253795 A1 | 11/2006 | Titov et al. |
| 2006/0274164 A1 | 12/2006 | Kimura et al. |
| 2007/0079251 A1 | 4/2007 | Peterkofsky et al. |
| 2007/0130232 A1 | 6/2007 | Therrien et al. |
| 2007/0143493 A1 | 6/2007 | Mullig et al. |
| 2007/0150810 A1 | 6/2007 | Katz et al. |
| 2007/0229524 A1 | 10/2007 | Hendrey et al. |
| 2007/0261025 A1 | 11/2007 | Seto et al. |
| 2008/0034013 A1 | 2/2008 | Cisler et al. |
| 2008/0126989 A1 | 5/2008 | Flores et al. |
| 2008/0307345 A1 | 12/2008 | Hart et al. |
| 2009/0176509 A1 | 7/2009 | Davis et al. |
| 2009/0198649 A1 | 8/2009 | Vaughan et al. |
| 2009/0260021 A1* | 10/2009 | Haenel et al. .............. 719/328 |
| 2009/0327952 A1 | 12/2009 | Karas et al. |
| 2010/0070888 A1 | 3/2010 | Watabe et al. |
| 2010/0162161 A1 | 6/2010 | Lin et al. |
| 2010/0231595 A1 | 9/2010 | Dang et al. |
| 2010/0306171 A1 | 12/2010 | Antos et al. |
| 2010/0312754 A1 | 12/2010 | Bear et al. |
| 2010/0325574 A1 | 12/2010 | Olsen |
| 2011/0029907 A1 | 2/2011 | Bakhash |
| 2011/0066457 A1* | 3/2011 | Chang et al. ..................... 705/7 |
| 2011/0113365 A1 | 5/2011 | Kimmerly et al. |
| 2011/0161316 A1* | 6/2011 | Jeh et al. .................. 707/727 |
| 2011/0161915 A1* | 6/2011 | Srinivasamoorthy et al. ........................ 717/101 |
| 2011/0202932 A1* | 8/2011 | Borghini et al. ............. 719/321 |
| 2012/0084689 A1* | 4/2012 | Ledet et al. ................. 715/769 |
| 2012/0284662 A1 | 11/2012 | Kumar et al. |
| 2012/0287114 A1 | 11/2012 | Hallock et al. |
| 2012/0290982 A1 | 11/2012 | Hallock et al. |

OTHER PUBLICATIONS

"iTEMcONTAINER Control Pattern", Retrieved at <<http://msdn.microsoft.com/en-us/library/ee671280(VS.85).aspx>>, Retrieved date: Feb. 21, 2011, pp. 4.

Greg L., "Handling Large Data Sets with C1 DataGrid and C1 Chart", Retrieved at<<http://helpcentral.componentone.com/CS/silverlight_161/b/silverlighUarchive/201 0106/17/handling-large-data-sets-with-c1 datagrid-and-c1 chart.aspx>>, Jun. 17, 2010, pp. 5.

Wyland, Robert, "Making the Switch: PC to Mac", Retrieved at <<http://blog.platinumsolutions.com/node/248>>, dated Jul. 13, 2009, pp. 12.

"Using Aero Flip 3D", Retrieved at <<http://windows.microsoft.com/en-IN/windows7/Using-Aero-Flip-3D>>, Retrieved Date: Feb. 14, 2011, p. 1.

O'Reilly, Dennis., "Freeware lets you scroll your desktop sideways", Retrieved at <<http://news.cnet.com/8301-13880_3-20009813-68.html>>, dated Jul. 8, 2010, pp. 4.

McElhearn, Krik., "Six tips for using the Dock efficiently", Retrieved at <<http://www.macworld.com/article/146966/2010/03/dockuse.html>>, dated Mar. 10, 2010, pp. 5.

"Windows Vista", Retrieved at <<http://www.axzopress.com/downloads/pdf/1423959094fc.pdf>>, Retrieved Date: Feb. 14, 2011, pp. 6.

Kimmerly, et al., "Scrolling Large Data Sets", U.S. Appl. No. 12/615,235, filed Nov. 9, 2009, pp. 28.

"WinForms Schedule Control Quick Start Guide", Retrieved at <<http://www.devcomponents.com/kb/questions.php?questionid=122>>, Retrieved Date: Feb. 22, 2011, pp. 20.

"HTC Touch Dual Review", Retrieved at <<http://www.phonearena.com/reviews/HTC-Touch-Dual-Review_id1905/page/3>>, Posted Date: Feb. 12, 2008, pp. 6.

Nicol, et al., "The Integrated Genome Browser: free software for distribution and exploration of genome-scale datasets", vol. 25, No. 20, 2009, pp. 2730-2731.

Integrated Genome Browser User's Guide, Oct. 2009, 108 Pages.

Office Action, U.S. Appl. No. 13/100,304, filed May 4, 2011, Notification Date: Jun. 7, 2013, pp. 11.

Office Action, U.S. Appl. No. 13/100,304, filed May 4, 2011, Notification Date: Jan. 7, 2013, pp. 12.

Office Action, U.S. Appl. No. 13/105,002, filed May 11, 2011, Notification Date: Mar. 19, 2013, pp. 27.

Office Action, U.S. Appl. No. 13/104,993, filed May 11, 2011, Notification Date: Mar. 15, 2013, pp. 24.

Shannon, Ross., "Objects and Properties", Retrieved at <<http://www.yourhtmlsource.com/javascript/objectsproperties.html>>, Retrieved Date: Mar. 21, 2011, pp. 3.

Office Action, U.S. Appl. No. 13/105,002, filed May 11, 2011, Notification Date: Nov. 13, 2013, pp. 29.

Office Action, U.S. Appl. No. 13/104,993, filed May 11, 2011, Notification Date: Oct. 25, 2013, pp. 23.

Office Action, U.S. Appl. No. 13/100,304, filed May 4, 2011, Notification Date: Jan. 29, 2014, 24 Pages.

Office Action, U.S. Appl. No. 13/100,304, filed May 4, 2011, Notification Date: July 7, 2014, 19 Pages.

Office Action, U.S. Appl. No. 13/104,993, filed May 11, 2011, Notification Date: Mar. 28, 2014, 24 Pages.

Office Action, U.S. Appl. No. 13/104,993, filed May 11, 2011, Notification Date: Sep. 12, 2014, 17 Pages.

* cited by examiner

VALUE PROVIDER SUBSCRIPTIONS FOR SPARSELY POPULATED DATA OBJECTS

BACKGROUND

Software that accesses a portion of a data object may load an entire data object only to access a portion of the properties within the data object. Such a situation may occur when a binding is made to the data object, but may cause performance problems when the data object is very large and the requested data is relatively small.

Further, some data objects may be populated by various processes. In some situations, the processes that provide data may not be known at design time and may be changed or updated after a software application is installed. In such situations, the application may not be aware of the existence of value providers for portions of the data objects.

SUMMARY

A calling routine may identify portions of a data object that may be populated by other executable routines by creating a property requested event. An event may be created for the requested property and one or more subscribing routines may launch. The subscribing routines may process separately from the calling routine and return property values, which in turn may create a property changed event, which may be subscribed to by the calling routine. The calling routine may then process the requested data. In one embodiment, a virtualized data object may be populated on a property-by-property basis by various subscribing routines, creating a sparsely populated virtualized data object that may be updated dynamically by routines identified at runtime.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
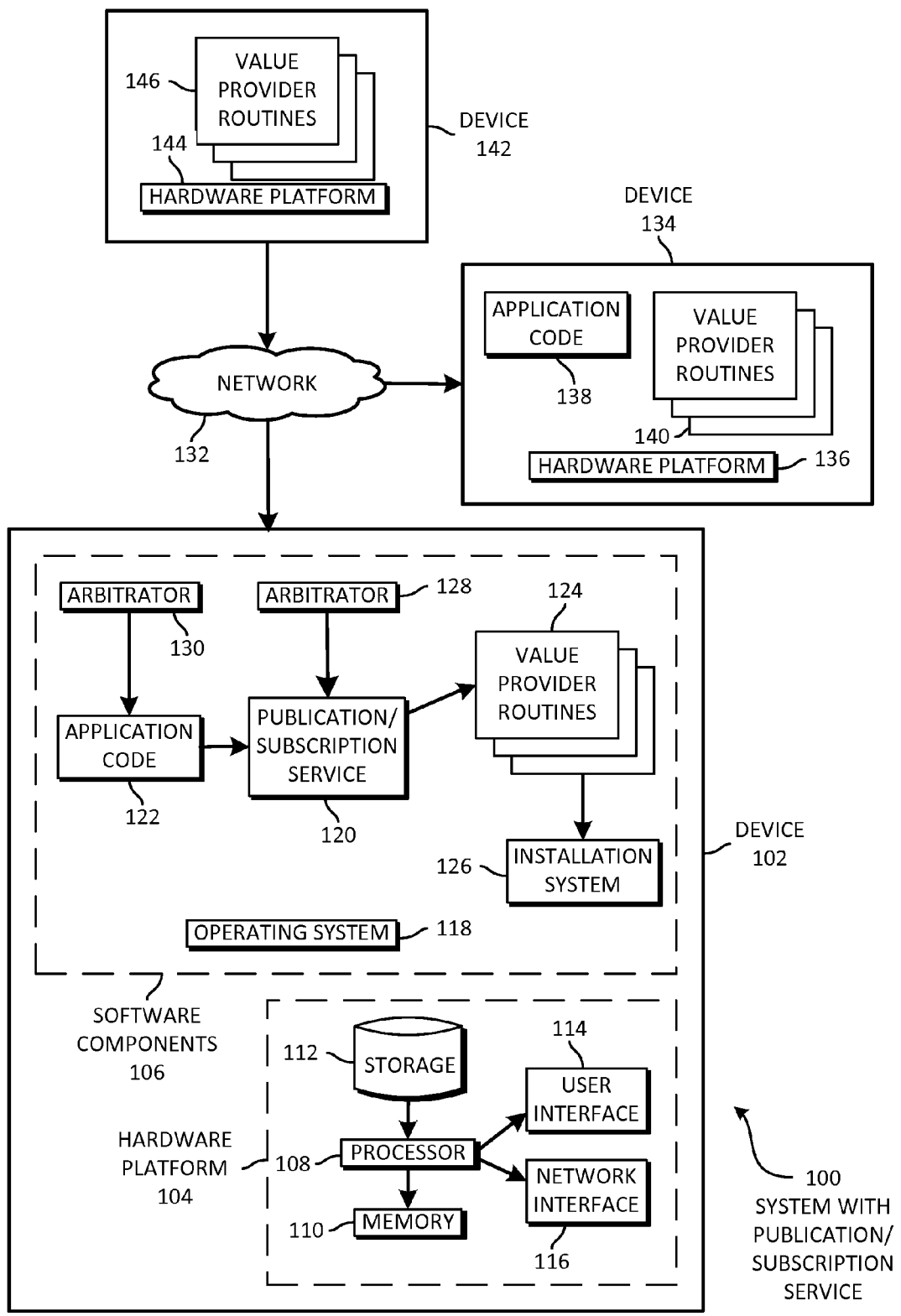
FIG. 1 is a diagram of an embodiment showing a network environment with a publication/subscription service.

A publication/subscription model is used to populate properties at runtime. For a given property, a request for a property value may be created for which one or more routines may subscribe. The subscribing routines may operate independently of the calling routine. When the subscribing routines determine the requested value, they may create a property changed event. The calling routine may subscribe to the property changed event, causing the updated value to the processed by the calling routine.

The model allows a system to be configured at runtime to include or exclude functionality, and to be upgraded and changed as time goes on without having to recompile and redistribute code.

In one use scenario, a user interface may be created that displays an icon for a file. The icon may be generated by three different routines. A simple routine may supply just a generic icon. A second routine may determine a file type, fetch a corresponding icon from a database, and return the corresponding icon. A third routine may retrieve the file, generate a snapshot image of the file, and return the snapshot image. The first routine may return a result the quickest, followed by the second and third routine, due to the additional processing steps for each routine.

In the scenario, each of the icon-generating routines may be subscribers to an event that requests an icon. The event may be generated by the calling routine that creates the user interface, and all three routines may begin processing the request. As each routine completes processing, that routine may create a completion event, which is subscribed to by the calling routine. The calling routine may then retrieve the data from a data object and place the icon on the user interface.

In the scenario, the icon-generating routines may be added, changed, or removed over time. For example, an embodiment operating on a handheld device with limited processing power may only have the first routine, while a powerful desktop computer may be outfitted with all three routines. Such configuration changes may be made without changing the executable code.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a device 102 that may have a subscription service for providing values for various properties. Embodiment 100 is an example of a device in a network environment in which application code may interface with various value provider routines using a publication/subscription interaction model.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates an environment in which a publication/subscription mechanism may connect application code with various value provider routines. The architecture may allow an application code to be connected to different value provider routines, and vice versa. One use model for such an architecture includes deploying and reconfiguring applications without recompiling application code. Another use model may be to separate different functions in the application into independently operating threads that may be performed on a single processor or distributed to many different processors.

The publication/subscription mechanism may operate by receiving a publication request from one process and transmitting that request to one or more processes that subscribe to that type of request. The processes receiving the request may treat the request as an event that starts a process or interrupts an executing process.

In one example, a user interface for browsing objects may include a large number of visual representations of the objects. The user interface may be constructed with a very large number of objects, but may only show a small number on a display at any one time. The data structure may include instances of all the objects, but may only populate properties for objects that are actually displayed.

In the example, the system may request properties to be populated by sending requests to a publication/subscription mechanism. Subscribing processes may receive the requests and begin to populate the properties. As the properties are populated, the subscribing processes may create an event through the publication/subscription mechanism so that the user interface process may be notified that the property is available. The user interface process may then update the display with the new property.

Continuing with the example, there may be several value provider routines that subscribe to provide a single property. There may be three or four different processes that can provide icons or other graphical element for an object, for example. In such a case, all of the processes may be started simultaneously. One may be intended to return a result quickly, so that the initial result may be displayed right away, while other processes may return more detailed results more slowly.

In the example, the user interface may be used for browsing movies or images. As a movie is placed in the viewing area, a request for a graphical representation may be sent to the publication/subscription mechanism, which may start several value provider processes. One value provider process may be a default process that returns a generic, static icon. A second value provider process may return a static image of the movie, while a third value provider process may return an animated video clip.

In the example, the default value provider process may return a value very quickly and the user interface may render the default icon right away. Over time, the other value providers may return and cause the user interface to be updated.

In cases where two or more value provides may subscribe to provide a specific data item, an arbitrator may determine when and if a second value supersedes or preempts a previously received value. In many cases, the value providers may be arranged in a prioritized order such that data returned from higher priority value providers may not be overwritten or preempted by lower priority value providers.

In the example above, the value provider that creates animated video clips for display on the user interface may preempt the generic, static icon. However, if the generic, static icon is received after the animated video clip, the static icon may be ignored in favor of the animated clip.

Embodiment 100 is an example of a network environment in which a device 102 may operate a publication/subscription service 120. The device 102 may have a hardware platform 104 and software components 106.

The device 102 may represent a server or desktop computer, however, the device 102 may be embodied in any type of device with a computing processor. Examples may include a personal computer, game console, cellular telephone, netbook computer, or other computing device.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include a user interface 114. The user interface 114 may include display devices, such as monitors and printers, as well as input devices such as keyboards, pointing devices, touchscreens, or other user interface components.

The hardware platform 104 may also include a network interface 116. The network interface 116 may include hard-wired and wireless interfaces through which the device 102 may communicate with other devices.

The software components 106 may include an operating system 118 on which applications and various services may execute. The operating system 118 may provide interfaces between the hardware platform 104 and various applications and services.

A publication/subscription service 120 may link together application code 122 and value provider routines 124. The application code 122 may send requests to the publication/subscription service 120 to which value provider routines 124 may subscribe. In the event of a request from the application code 122, the publication/subscription service 120 may send a notification to each subscribing value provider routine 124, which may process the request. When the value provider routines 124 have completed the request, they may send a response to the publication/subscription service 120 which may notify the requesting application code.

In many embodiments, the application code 122 may create a data object or set of data objects that may be partially populated by the value provider routines 124. In such embodiments, a large data object may be created where only a small subset of the data object's properties are populated by the value provider routines 124. Such embodiments may result in sparsely populated data objects.

The data objects may be created by application code 122 and a binding may be created between the application code 122 and the data object in some embodiments. When a request to populate one or more properties associated with the data object, a binding may be created between a value provider routine 124 and the requested property. The value provider routine 124 may dissolve the binding after populating the property.

When an application is initially installed, the application code 122 may create various publication channels that identify data that may be provided by value provider routines 124. In many cases, an installation process may also set up the value provider routines 124 as subscribers to the corresponding channels.

The configuration and in some cases the functionality of an application may be changed or upgraded by installing other value provider routines 124. The new value provider routines 124 may be installed in addition to existing value provider routines 124, or may replace existing value provider routines 124. Such a change may be made without changing the application code 122, which may make distributing and upgrading a software package less complicated, as the application code 122 is not recompiled.

The configuration of an application may be tailored to a specific environment by changing the value provider routines 124. For example, an application may be deployed on a desktop computer with one set of value provider routines 124 while the same application may be ported and deployed to a cellular telephone by installing the same application code 122 but with a different set of value provider routines 124.

Each value provider routine 124 may provide specific values to many different applications. In the example above, a set of value provider routines may provide graphical objects or data for a movie browser application as well as a file browser application, movie viewing application, or other application. Each of the various applications may submit requests to the publication/subscription service 120 for specific data, and the value provider routines 124 may fetch and return the data. The value provider routines 124 may be agnostic to which application may request the data.

In some embodiments, an installation system 126 may configure and install value provider routines 124 to the device 102. The installation system 126 may periodically receive new value provider routines 124 and configure the new value providers as subscribers to various channels on the publication/subscription service 120.

The system of the application code 122, publication/subscription service 120, and value provider routines 124 may have each of the various components executing as different processes or different threads on a single device with one or more processors. Such a device may have one or more of the processes or threads operating on different processors.

In some embodiments, the publication/subscription service 120 may operate over a network 132 to communicate with other devices. In such embodiments, either the application or value provider service, or both, may be located on different devices, where each device has a different processor.

For example, a device 134 may have a hardware platform 136 similar to the hardware platform 104 which contains a processor. The device 134 may have application code 138 and value provider routines 140 that provide publication information and subscribe to channels from the publication/subscription service 120 on device 102.

In some embodiments, a specific application may have value provider routines located locally and some located remotely. For example, application code 122 may publish a channel on the publication/subscription service 120 that has a local value provider routine 124 as a subscriber, plus a value provider routine 146 that operates on a device 142. Device 142 may be yet another device accessible over the network 132 that has a hardware platform 144 that contains a processor.

In such embodiments, the application's local value provider routine 124 may respond with a generic response that allows the application to proceed, while a remote value provider routine 140 may provide a detailed response. The remove value provider routine 140 may be, for example, a remote service that accesses a database or provides complex processing that may be unavailable on the device 102.

Figure 2:
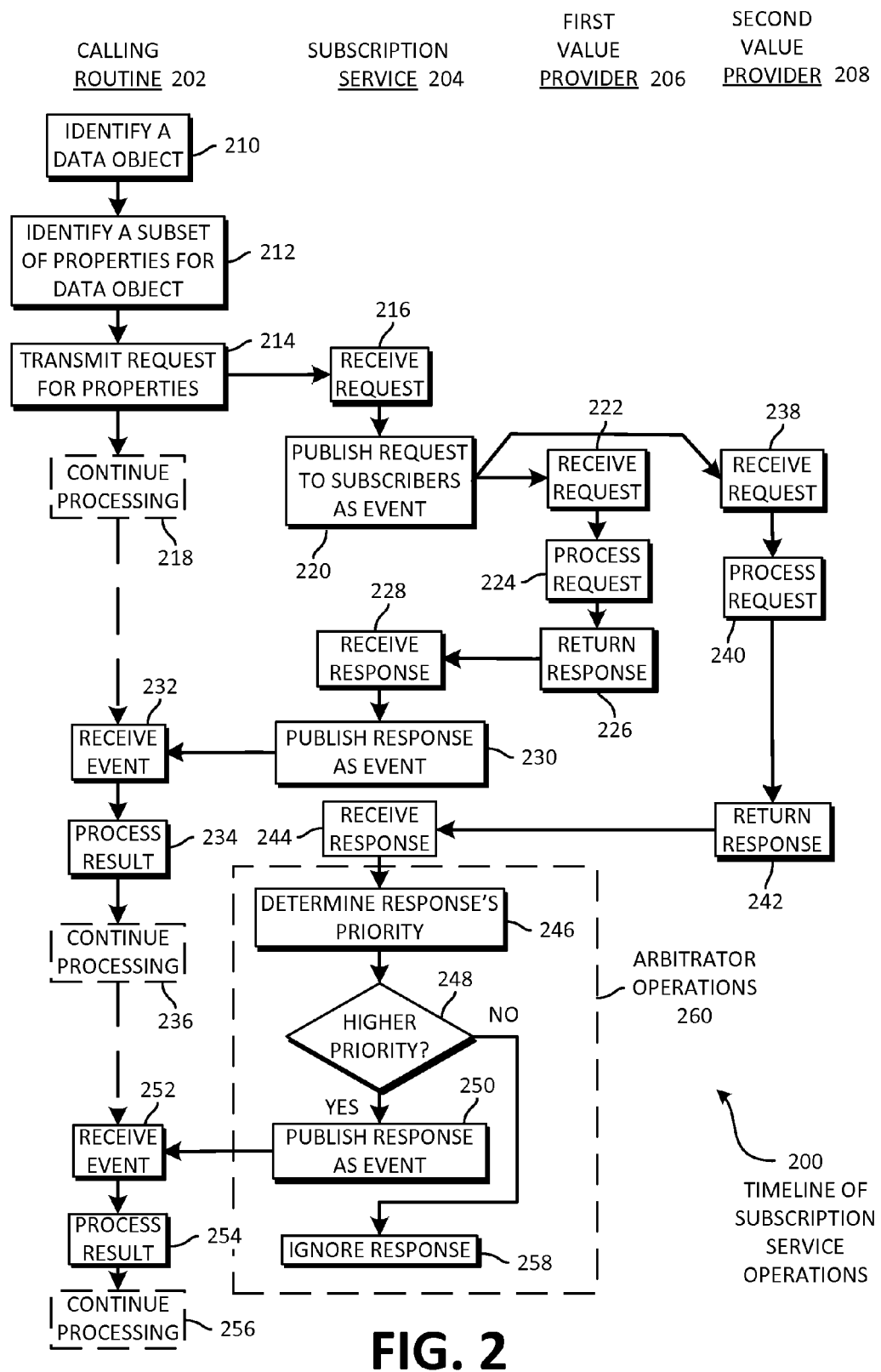
FIG. 2 is a timeline diagram of an embodiment showing a method for subscription service operations.

FIG. 2 is a timeline illustration of an embodiment 200 showing the interactions of a calling routine 202, a subscription service 204, a first value provider 206, and a second value provider 208. The figure shows the interactions of the various components as a calling routine requests data.

The operations of the calling routine 202 are illustrated in the left hand column. The operations of the subscription service 204 are illustrated in the second column from the left. The operations of the first subscription service 206 and second subscription service 208 are illustrated in the third and fourth columns from the left, respectively.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates the interactions of a single calling routine with two value providers. The two value providers both subscribe to the same channel in the subscription service to receive a request from the calling routine. The first value provider returns a response before the second value provider. In some cases, the response from the second value provider may be ignored while in other cases the response from the second value provider may be used in place of the response from the first value provider.

The decision for whether or not to use the second response may be performed by an arbitrator. In some embodiments, the arbitrator operations may be performed by the calling routine, but in embodiment 200, the arbitrator operations are illustrated as being performed by the subscription service 204.

In block 210, the calling routine 202 may identify a data object. Various properties may be defined in block 212 from the data object. These properties may be determined by the value providers.

In some embodiments, the properties may be a subset of all the properties of the data object. In such cases, the data object may be a sparsely populated data object where only certain properties are populated. Some properties that may not be used may never be populated and therefore computational time may not be expended on unused properties.

Some embodiments may virtualize the data objects. A virtualized data object may be a data object that is defined but for which memory has not been allocated. In many cases, a virtualized data object may have memory allocated on demand, such as when a property is populated. Virtualized data objects may consume less memory than conventional data objects that are populated when instantiated.

In block 214, the calling routine 202 may transmit a request for a property to the subscription service 204. The subscription service 204 may receive the request in block 216.

The subscription service 204 may have a publication channel set up for the specific property and may publish the request for the property in block 220. The first value provider 206 and second value provider 208 may receive the request in blocks 222 and 238, respectively.

Once the request is transmitted in block 214, the calling routine 202 may go on continue processing in block 218.

The first value provider 206 may process the request in block 224 and return a response in block 224.

In many embodiments, the subscription service 204 may be configured with a publication channel to which the calling routine 202 may subscribe. In such embodiments, the subscription service 204 may publish the response in block 230 as an event that is received in block 232 by the calling routine 202.

The calling routine 202 may receive the event as an interrupt and may process the result in block 234, then continue processing in block 236.

The second value provider 208 may process the request in block 240 and may return a result in block 242 after the first value provider 206 has completed.

The subscription service 204 may receive the response in block 244. At this point in the process, two value providers have responded to a request for a property. A determination may be made whether to ignore the second response or to override the first response. These operations are the arbitrator operations 260.

The response's priority may be determined in block 246. If the second response has a higher priority in block 248, the response may be published as an event in block 250. The calling routine 202 may receive the event in block 252, process the result in block 254, and continue processing in block 256. In this case, the value from the second value provider 208 may supersede or replace the result from the first value provider 206.

In some embodiments, a common memory object may be made available to both the calling routine 202 and the value providers. In such embodiments, the calling routine 202 may define a virtualized memory object that may be populated directly by the value providers. When the value providers update or change the values, the subscription service may notify the calling routine 202, which may then access the memory object and process the result. Such embodiments may not pass the results through the subscription service as a message to minimize handling of the data.

In other embodiments, the responses from the value providers may be include the data associated with the response. One example may be a response from a value provider that may be located remotely and may not have access to a virtualized data object on the same device as the calling routine. In some such embodiments, a subscription service operating on the same device as the calling routine may populate the virtualized data object prior to sending an event to the calling routine.

Figure 3:
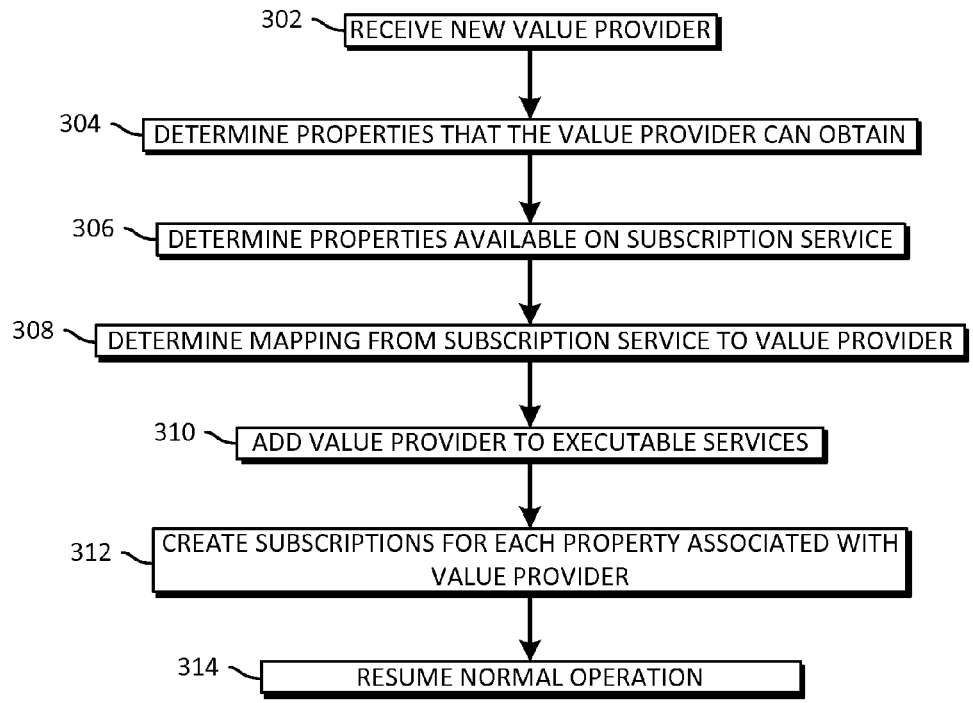
FIG. 3 is a flowchart of an embodiment showing a method for installing value provider services.

FIG. 3 is a flowchart illustration of an embodiment 300 showing a method for installing a new value provider. The operations of embodiment 300 may be performed when a value provider is added to a system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Value providers may be added to a system from time to time. In some cases, new value providers may be added to a system after distributing an application. This may be one mechanism for upgrading, improving, or reconfiguring an application without changing a bulk of the executable code.

In block 302, a new value provider may be received.

The properties that the value provider may provide are defined in block 304. The subscription service may be examined in block 306 to determine what channels are defined for specific properties. A mapping between the subscription channels and the properties provided by the value provider may be determined in block 308.

The value provider may be added to executable services in block 310. In some cases, value providers may be services that are able to be quickly loaded in to memory and executed. Some such services are long running applications that stay in a background mode or hibernate until called.

For each of the properties that the value provider may provide, a subscription may be created in block 312. The subscription may cause a subscription service to send an alert, event, or other message to the value provider when a publication is received on the particular channel. The alert or event may cause the value provider to execute and provide the requested information.

After the value provider is installed, normal operation may resume in block 314.

Figure 4:
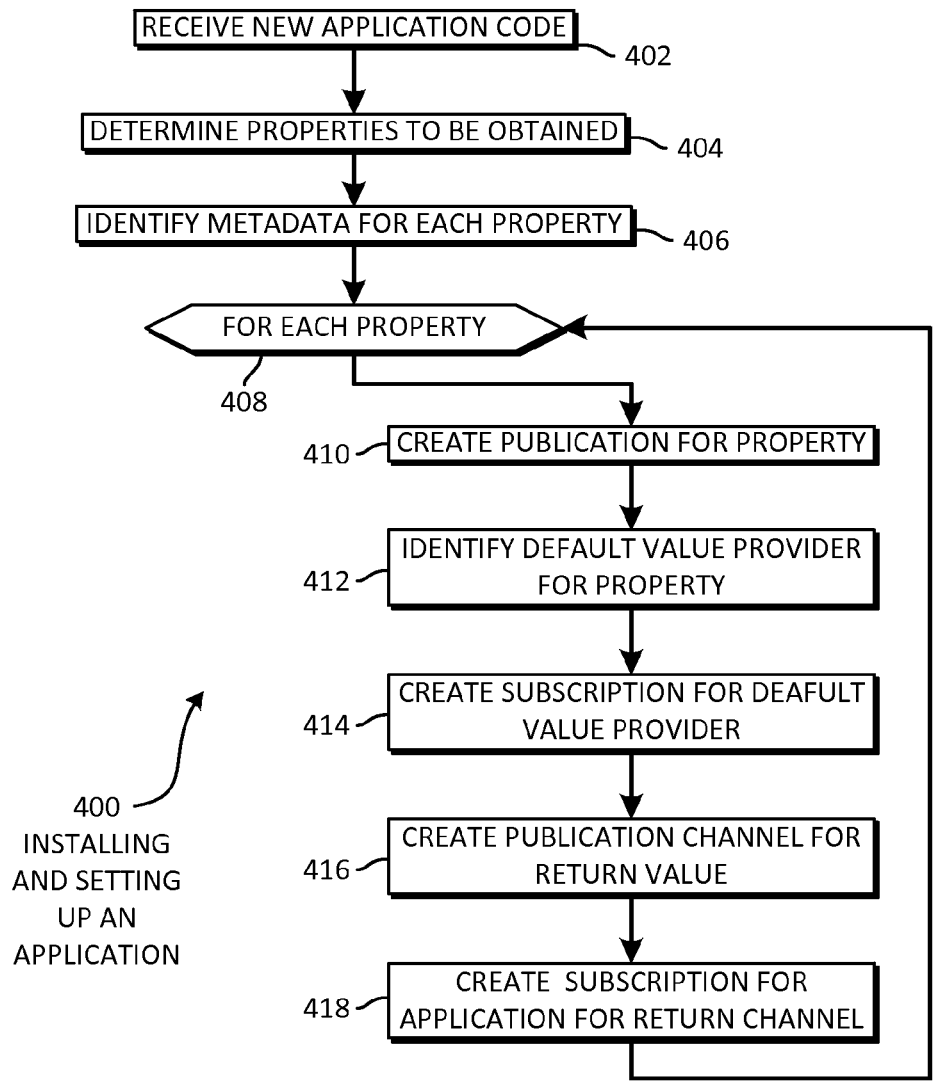
FIG. 4 is a flowchart of an embodiment showing a method for installing applications.

FIG. 4 is a flowchart illustration of an embodiment 400 showing an installation process for an application. The operations of embodiment 400 illustrate how a new application may be installed with default value providers. Once the application is installed, additional value providers may be added that may enhance or change the performance or functionality of the overall application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one method by which an application may be installed and initially configured. After the application is operational, value providers may be changed out, upgraded, or added to change the functionality of the application.

In block 402, a new application may be received.

The properties that may be obtained from value providers may be determined in block 404 for the application. In block 406, various metadata about the properties may be determined as well. The metadata may be added to the subscription service so that properties may be identified for value providers as the value providers are installed.

For each property in block 408, a publication channel may be created in block 410 for the property. A default value provider may be identified in block 412 for the property, and a subscription for the default value provider may be created in block 414 for the property.

In block 416, a publication channel may be created for the return value when the value provider completes processing, and a subscription for the application may be created in block 418 for the return value.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:
   identifying a data object comprising a plurality of properties;
   for a first property within said plurality of properties, a calling routine issuing a first property request event comprising said first property;
   identifying a first value provider having a subscription for said first property request event and causing said first value provider to determine a first property value for said first property;
   receiving said first property value for said first property from said first value provider in response to said first property request event and issuing a first property changed event;
   receiving said first property changed event and processing said first property value in response to receiving said first property changed event;
   receiving a second value provider; and
   installing said second value provider, said second value provider providing a second value for said first property and issuing a second property changed event, said second value provider executing to provide said second value based on a property request event for said first property, said installation of said second value provider being performed without changing application code for said calling routine.

2. The method of claim 1 further comprising:
   identifying a plurality of value providers having subscriptions for said first property request event and causing all of said plurality of value providers to determine property values for said first property.

3. The method of claim 1, said data object comprising said properties that are displayed on a user interface, said processing said first property value comprising displaying said first property value on said user interface.

4. The method of claim 2 further comprising:
   receiving a plurality of said property values, each of said property values being different, and selecting one of said property values as said first property value.

5. The method of claim 2 further comprising:
   receiving a third property value for said first property from a third value provider in response to said first property request event, said third property value being different from said first property value and said third value provider being different from said first value provider;
   receiving said third property value for said first property and issuing a third property changed event; and
   receiving said third property changed event and retrieving and processing said third property value.

6. The method of claim 5, receiving said third property value after retrieving and processing said first property value.

7. The method of claim 2 further comprising:
   receiving a third property value for said first property from a third value provider after receiving said first property value;
   determining that said third property value has a lower priority than said first property value; and
   discarding said third property value.

8. A system comprising:
   at least one processor;
   a calling routine being configured to operate on said at least one processor, said calling routine being configured to identify a data object having a first property and being configured to issue a first property change request for said first property, said first property change request being an event;
   a subscription service for said first property change request having a first value provider subscribed to said subscription service, said subscription service being configured to receive said first property change request and being configured to cause said first value provider to execute based on said first property change request;
   said subscription service being further configured to receive a first value from a first value provider and being configured to issue a property changed event in response to said first property change request, said calling routine having a subscription to said property changed event, said calling routine being further configured to receive said first value as a result of said property changed event; and
   said subscription service being further configured to install a second value provider, said second value provider being configured to provide a second value for said first property, said second value provider being configured to execute based on a property change request for said first property, said second value provider being created after said calling routine is created.

9. The system of claim 8, wherein said subscription service is configured to operate on said at least one processor.

10. The system of claim 9, wherein said first value provider is configured to operate on said at least one processor.

11. The system of claim 8, wherein said subscription service is configured to operate on a different processor than said at least one processor.

12. The system of claim 8, wherein said first value provider is configured to operate on a different processor than said at least one processor.

13. The system of claim 8, wherein said second value provider is configured to execute based on said first property change request to provide said second value for said first property.

14. The system of claim 13 further comprising:
an arbitrator that is configured to evaluate said first value from said first value provider and said second value from said second value provider to determine a priority for said first value and said second value for said calling routine.

15. The system of claim 14, wherein said arbitrator is part of said calling routine.

16. The system of claim 14, wherein said arbitrator is part of said subscription service.

17. The system of claim 8, wherein said calling routine is configured to display a representation of said first value in response to receiving said first value, and said calling routine is configured to replace said representation of said first value with a displayed representation of said second value in response to receiving said second value.

18. The system of claim 8, wherein said subscription service is further configured to receive a second value from said second value provider and to issue a second property changed event for said second value in response to said first property change request, said calling routine having a subscription to said second property changed event, said calling routine being further configured to receive said second value as a result of said second property changed event, said second value being different from said first value.

19. Computer-readable storage hardware having computer-executable instructions embodied thereon that, when executed by at least one processor, cause the at least one processor to perform acts comprising:
identifying a data object comprising a plurality of properties;
for a first property within said plurality of properties, a calling routine issuing a first property request event comprising said first property;
identifying a first value provider having a subscription for said first property request event and causing said first value provider to determine a first property value for said first property;
receiving said first property value for said first property from said first value provider in response to said first property request event and issuing a first property changed event;
receiving said first property changed event and processing said first property value in response to receiving said first property changed event;
receiving a second value provider; and
installing said second value provider, said second value provider providing a second value for said first property and issuing a second property changed event, said second value provider executing to provide said second value based on a property request event for said first property, said second value provider being created after said calling routine is created.

20. The computer readable storage hardware of claim 19, wherein the acts further comprise:
identifying a plurality of value providers having subscriptions for said first property request event and causing all of said plurality of value providers to determine property values for said first property; and
receiving a plurality of said property values, each of said property values being different, and selecting one of said property values as said first property value.

* * * * *